(12) United States Patent
Jährling et al.

(10) Patent No.: US 8,882,351 B2
(45) Date of Patent: Nov. 11, 2014

(54) PULL-OUT GUIDE

(75) Inventors: Peter Jährling, Bünde (DE); Sven Budde, Lucerne (CH)

(73) Assignee: Paul Hettich GmbH & Co. KG, Kirchlengern (DE)

( * ) Notice: Subject to any disclaimer, the term of this patent is extended or adjusted under 35 U.S.C. 154(b) by 18 days.

(21) Appl. No.: 13/817,479

(22) PCT Filed: Aug. 18, 2011

(86) PCT No.: PCT/EP2011/064244
§ 371 (c)(1),
(2), (4) Date: Apr. 17, 2013

(87) PCT Pub. No.: WO2012/022788
PCT Pub. Date: Feb. 23, 2012

(65) Prior Publication Data
US 2013/0336602 A1    Dec. 19, 2013

(30) Foreign Application Priority Data
Aug. 20, 2010   (DE) .......................... 10 2010 037 097

(51) Int. Cl.
| | | |
|---|---|---|
| *A47B 88/04* | (2006.01) | |
| *F16C 29/00* | (2006.01) | |
| *F24C 15/16* | (2006.01) | |
| *A47B 88/10* | (2006.01) | |

(52) U.S. Cl.
CPC ............. *F16C 29/005* (2013.01); *F24C 15/168* (2013.01); *A47B 88/10* (2013.01)
USPC ............................ 384/18; 384/21; 312/334.45

(58) Field of Classification Search
USPC ....................... 384/18, 21, 49, 53; 312/334.45
See application file for complete search history.

(56) References Cited

U.S. PATENT DOCUMENTS

| | | | | |
|---|---|---|---|---|
| 3,588,198 | A |   | 6/1971 | Stewart |
| 5,209,572 | A | * | 5/1993 | Jordan ............................ 384/18 |

(Continued)

FOREIGN PATENT DOCUMENTS

| | | |
|---|---|---|
| DE | 30 19 367 | 11/1981 |
| DE | 10 2005 028 673 | 12/2006 |

(Continued)

OTHER PUBLICATIONS

German Search Report for Application No. 10 2010 030 097.5, dated Aug. 20, 2010.

*Primary Examiner* — Thomas R. Hannon
(74) *Attorney, Agent, or Firm* — Barnes & Thornburg LLP

(57) ABSTRACT

A pull-out guide for domestic appliances. The pull-out guide includes a guide rail, at least one additional rail displaceably mounted relative to the guide rail via a rolling body in a rolling-body cage, and at least one stop configured to limit a displacement path of the at least one additional rail. The at least one stop is configured as a first crosspiece and shaped onto one of the guide rail and the at least one additional rail. The at least one stop projects into the displacement path of one of the rolling-body cage and the rolling body. The rolling body is an outer rolling body. The at least one stop projects up to at least half of the radius of the outer rolling body or up to substantially a rotational axis of the outer rolling body, as seen in a direction of displacement.

9 Claims, 16 Drawing Sheets

(56) References Cited

U.S. PATENT DOCUMENTS

| | | | |
|---|---|---|---|
| 6,976,597 B2 | 12/2005 | Jährling et al. | |
| 2006/0273705 A1* | 12/2006 | Yeh | 312/334.31 |
| 2009/0195131 A1* | 8/2009 | Chi et al. | 312/334.44 |
| 2011/0123138 A1* | 5/2011 | Park et al. | 384/18 |

FOREIGN PATENT DOCUMENTS

| | | |
|---|---|---|
| DE | 20 2008 010 187 | 12/2009 |
| DE | 20 2009 001 963 | 9/2010 |
| WO | 2007/090738 | 8/2007 |

* cited by examiner

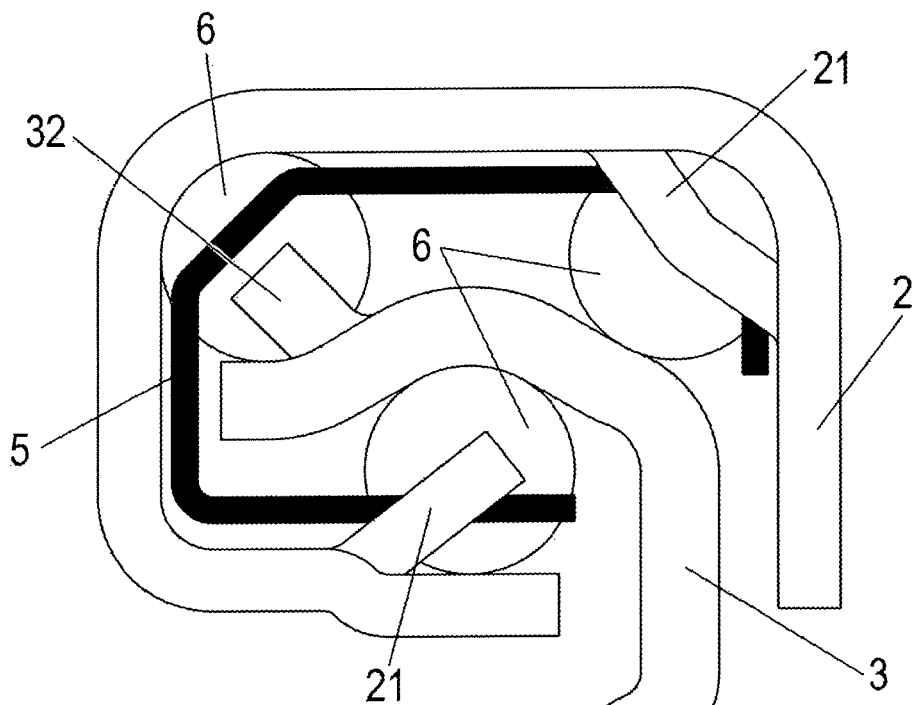
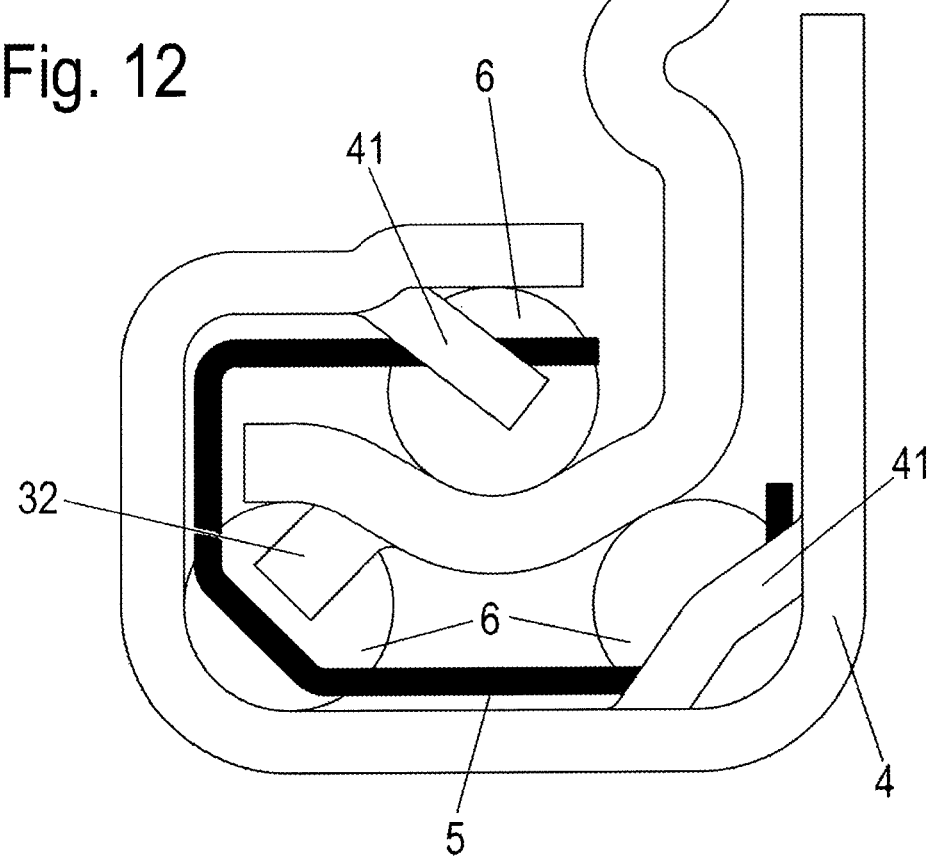
Fig. 12

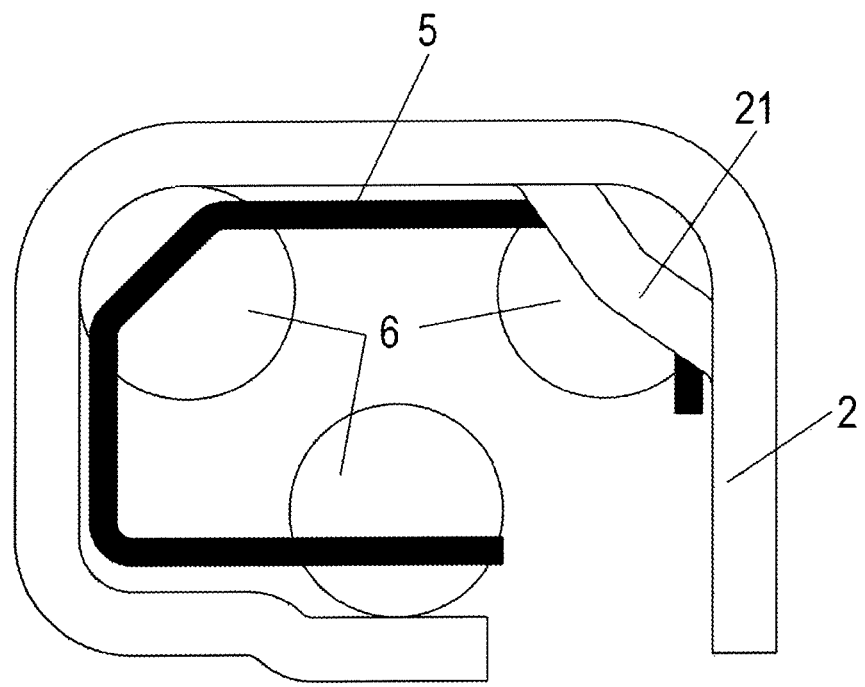
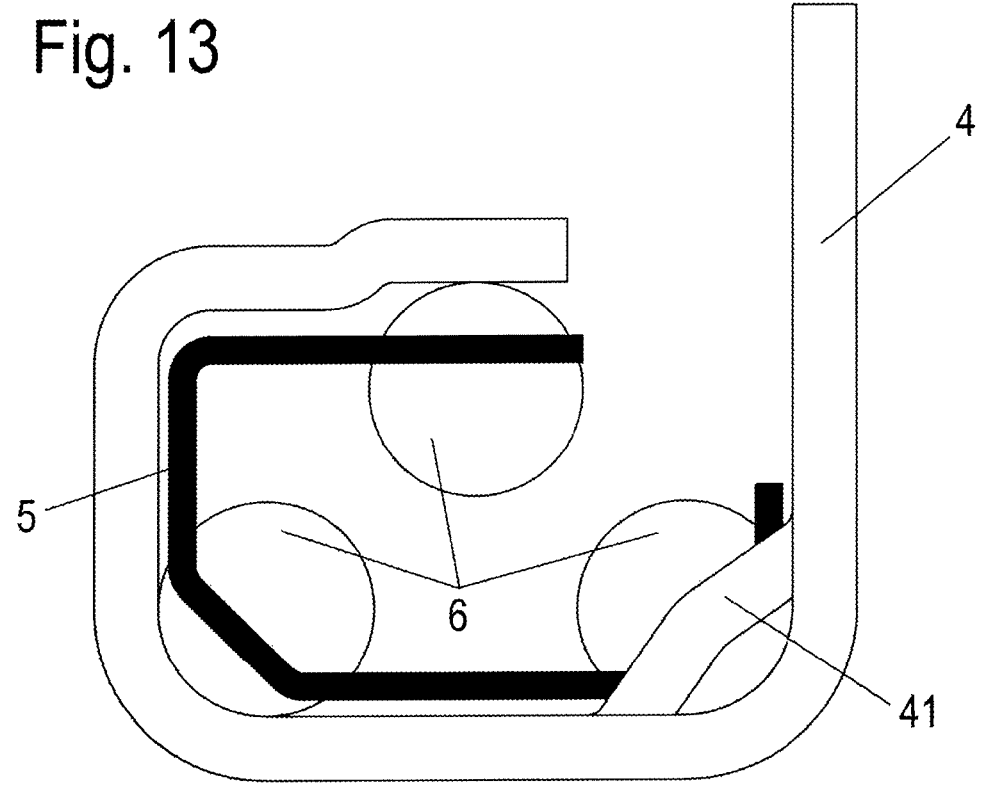
Fig. 13

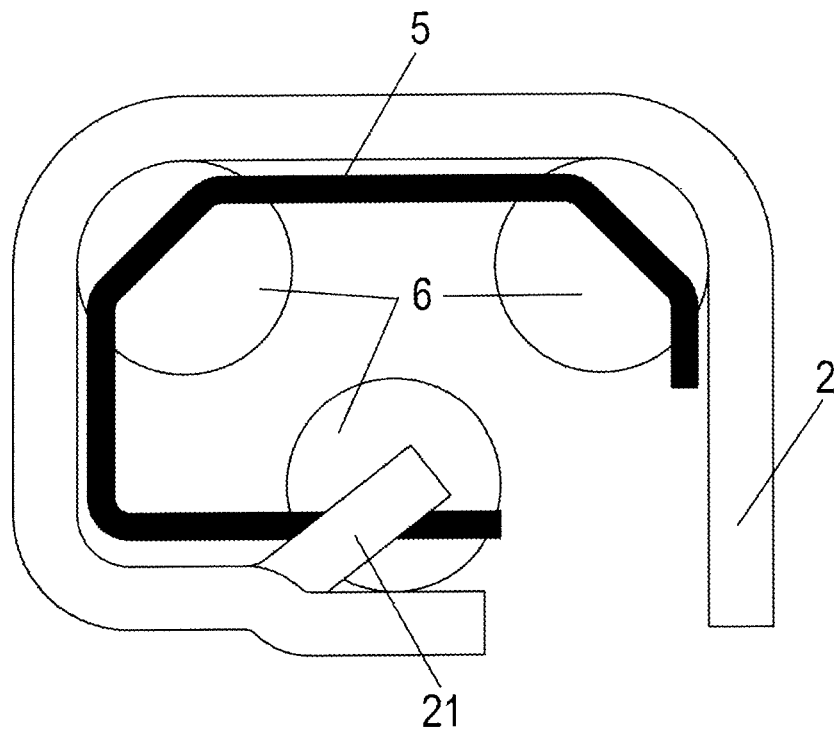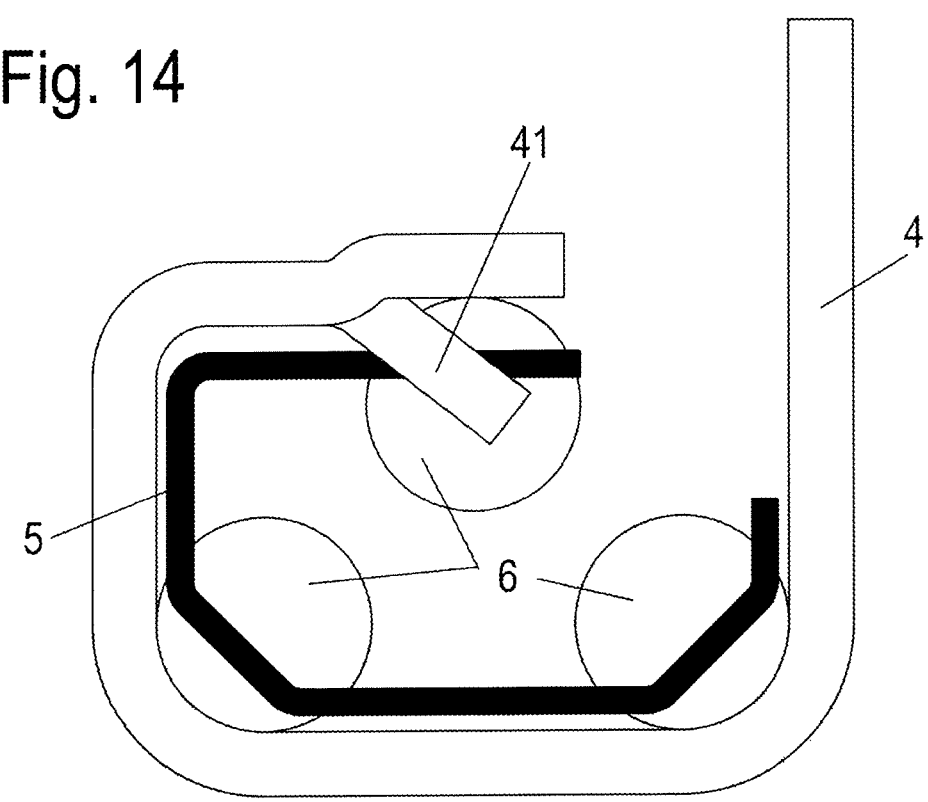
Fig. 14

PULL-OUT GUIDE

CROSS-REFERENCE TO RELATED APPLICATION

This application is a national stage of International Application PCT/EP2011/064244, filed Aug. 18, 2011, and claims benefit of and priority to German Patent Application No. 10 2010 037 097.5, filed Aug. 20, 2010, the content of which Applications are incorporated by reference herein.

BACKGROUND SUMMARY

The present invention relates to a pull-out guide for domestic appliances. The pull-out guide includes a guide rail, at least one additional rail displaceably mounted relative to the guide rail via a rolling body in a rolling-body cage, and at least one stop configured to limit a displacement path of the at least one additional rail. The at least one stop is configured as a first crosspiece and shaped onto one of the guide rail and the at least one additional rail.

Such pull-out guides are known in numerous embodiments from the state of the art. They frequently consist of a guide rail and at least one running rail. The running rail is displaceably held relative to the guide rail via rolling bodies which are accommodated in rolling-body cages. Pull-out guides are also known comprising a guide rail, a running rail and an interposed middle rail. The guide rail is displaceably held in relation to the middle rail via rolling bodies accommodated in rolling-body cages, and with the middle rail also being displaceably held relative to the running rail via rolling bodies accommodated in a rolling-body cage.

The paths of displacement of the individual rails with respect to one another are precisely defined. These paths in the individual components are usually configured in such a way depending on the pull-out path, the length of the spherical cages or the rolling-body cages and the rail length that path limits provided on the rails will be accessed simultaneously. A displacement of the rolling-body cages or spherical cages between the respective two rails may occur by certain external circumstances during transport of the pull-out guides as a result of vibrations or an unfavourable transport position in the package or also as a result of the presence of a large quantity of lubricant for lubricating the rolling bodies under simultaneous loading of the rails. This leads to the consequence that the rolling-body cage or spherical cage is prematurely moved to one of the stops. This offset may become so large that the pull-out guides cannot be opened and closed completely, or only with a major input of force. In order to produce the full running range of the pull-out guides again, the pull-out guide needs to be stretched, that is, it is pulled or pushed under application of force to its end position. In this process, the rolling bodies need to slide in a certain region because they are unable to reach the end position by mere rolling off.

Such stops for defining the running ranges of the rails, with respect to each other, are arranged on a rail in such a way that they will press the rolling bodies against the track of the opposite rail and therefore produce a wedging effect. This wedging effect leads to a high level of sliding friction, which again leads to a respectively high stretching force that needs to be applied. In the event of a simultaneously occurring lack of lubrication, this wedging effect may even lead to complete blockage of the pull-out guide. Such a lack of lubrication frequently occurs in pull-out guides which are subject to extreme environmental conditions. Examples for such conditions are baking ovens, pyrolysis ovens or dishwashers.

Embodiments of the present disclosure provide for a pull-out guide which can be pushed back or pulled back to its original state after a displacement of a rolling-body cage or a spherical cage with a low amount of stretching force and especially without any blockage.

Thus, an embodiment according to the present disclosure includes a pull-out guide for domestic appliances. The pull-out guide includes a guide rail, at least one additional rail displaceably mounted relative to the guide rail via a rolling body in a rolling-body cage, and at least one stop configured to limit a displacement path of the at least one additional rail. The at least one stop is configured as a first crosspiece and shaped onto one of the guide rail and the at least one additional rail. The at least one stop projects into the displacement path of one of the rolling-body cage and the rolling body, the rolling body being an outer rolling body. The at least one stop projects up to at least half of the radius of the outer rolling body or up to substantially a rotational axis of the outer rolling body, as seen in a direction of displacement.

In accordance with an embodiment of the present disclosure, the at least one stop for limiting the path of displacement of the at least one additional rail is arranged as a cross piece which is shaped on the guide rail or on the at least one additional rail and projects into the path of displacement of the rolling-body cage or of an outer rolling body, as seen in the direction of displacement. The crosspiece projects close to the rotational axis, for example, up to at least half the radius of the rolling body. As a result of the attack of the crosspiece on the rolling-body cage, the likelihood of blockage of one of the rolling bodies is excluded from the outset. If the crosspiece engages on at least half the height of the radius, for example, close to the rotational axis of the rolling body on the rolling body, this will not produce a force component perpendicular to the displacement direction, or only a very low such force, so that the rolling body will not be subject to any likelihood of being pressed from the plane of the displacement direction against one of the running surfaces of the rails.

Embodiments according to the present disclosure are discussed herein and in the appended claims.

According to an embodiment of the present disclosure, the crosspiece is arranged as a bridge shaped transversely to the direction of displacement and interacting in function with the rolling-body cage. From a production standpoint, such a bridge can be shaped very easily in a rail from the outside.

In accordance with another embodiment of the present disclosure, the pull-out guide includes at least one crosspiece which is arranged as a bridge shaped transversely to the direction of displacement and interacting in function with the rolling-body cage. In addition, a further crosspiece protrudes up to and close to the rotational axis, for example, up to the rotational axis of the rolling bodies. This further crosspiece interacts with a rolling body which is on the outside as seen in the direction of displacement. The combination of the two crosspiece embodiments allows an exceptionally reliable limitation of the running path.

In accordance with another embodiment of the present disclosure, the guide rail and the at least one additional rail include several running surfaces extending parallel with respect to one another for several rows of rolling bodies. The several rows of rolling bodies are arranged in the rolling-body cage parallel with respect to each other in the running direction. The crosspieces protrude into the path of displacement of the rolling-body cage and are shaped from a first running surface of one of the guide rails or one of the additional rails, and the crosspieces protruding into the path of displacement of the rolling bodies are shaped on one of the other guide rails parallel to the first running surface or an additional rail. This ensures that the crosspieces used as the running or displacement path limit will not collide with each other during the displacement of the rails relative to one another.

Other aspects of the present disclosure will become apparent from the following descriptions when considered in conjunction with the accompanying drawings.

BRIEF DESCRIPTION OF THE DRAWINGS

FIGS. 11 to 14 show front views of different embodiments of guide rails and running rails with rolling bodies arranged therein and differently arranged crosspieces, in accordance with the present disclosure.

DETAILED DESCRIPTION

In the description below, the terms such as above, below, left, right, front, and rear, for example, relate exclusively to the exemplary illustrations shown and position of the pull-out guide and other parts as shown in the respective drawings. These terms shall not be understood as being limiting in any way, which means such references can change in accordance with different working positions or mirror-symmetrical configurations, for example.

Figure 1:
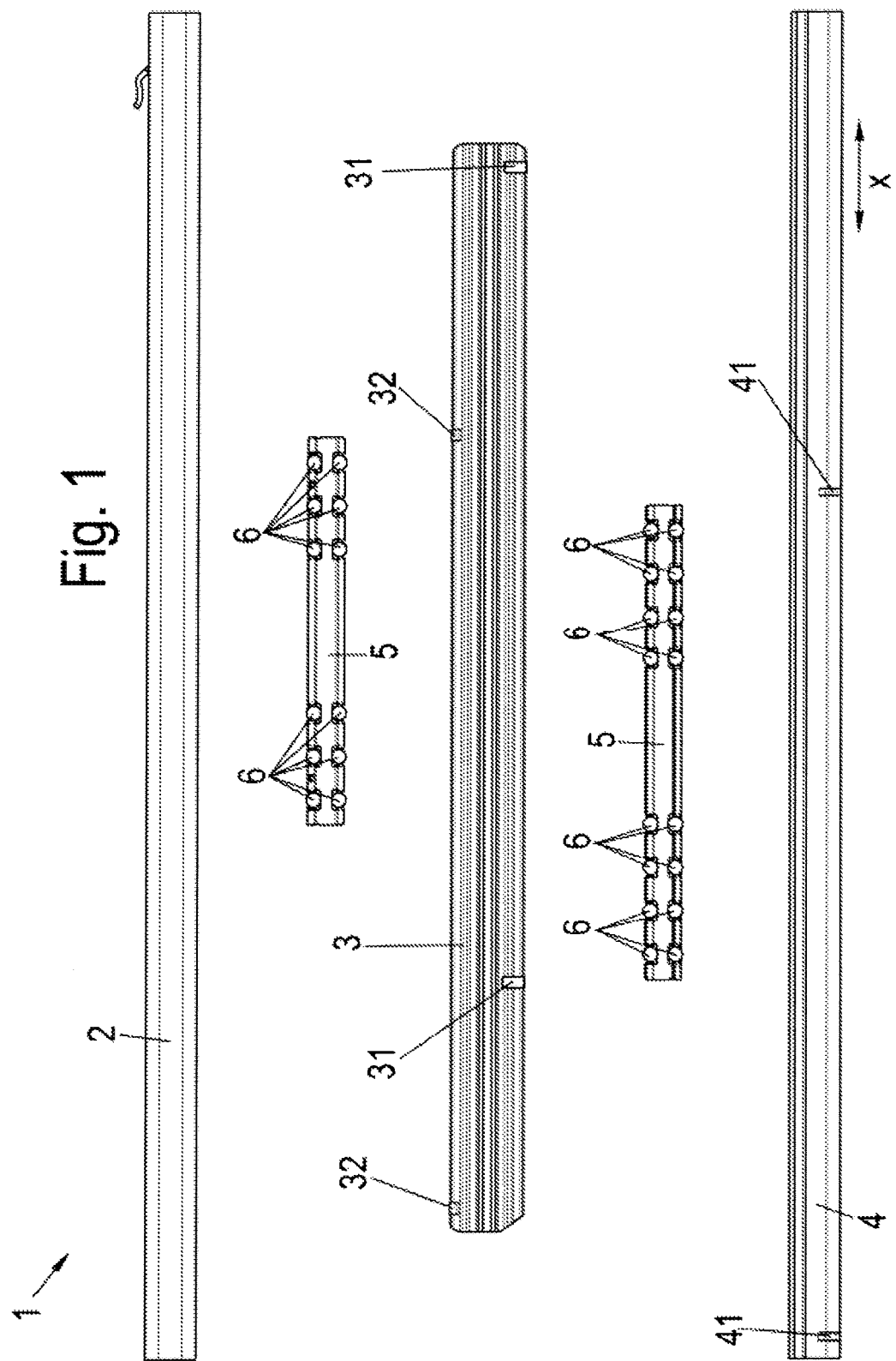
FIG. 1 shows an exploded side view of an embodiment of a pull-out guide, in accordance with the present disclosure.
Figure 2:
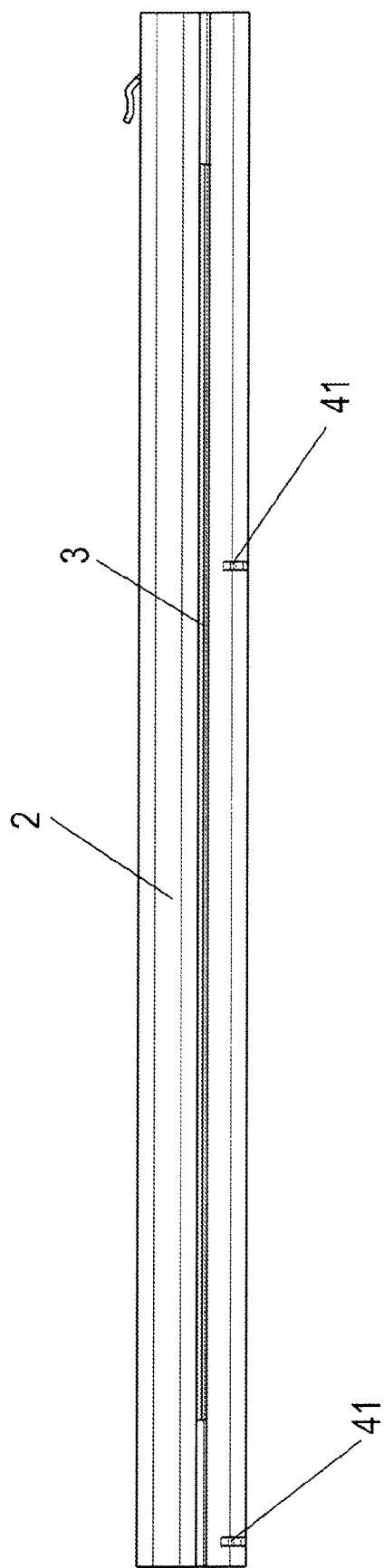
FIG. 2 shows a side view of the pull-out guide of FIG. 1 in the assembled state.
Figure 6:
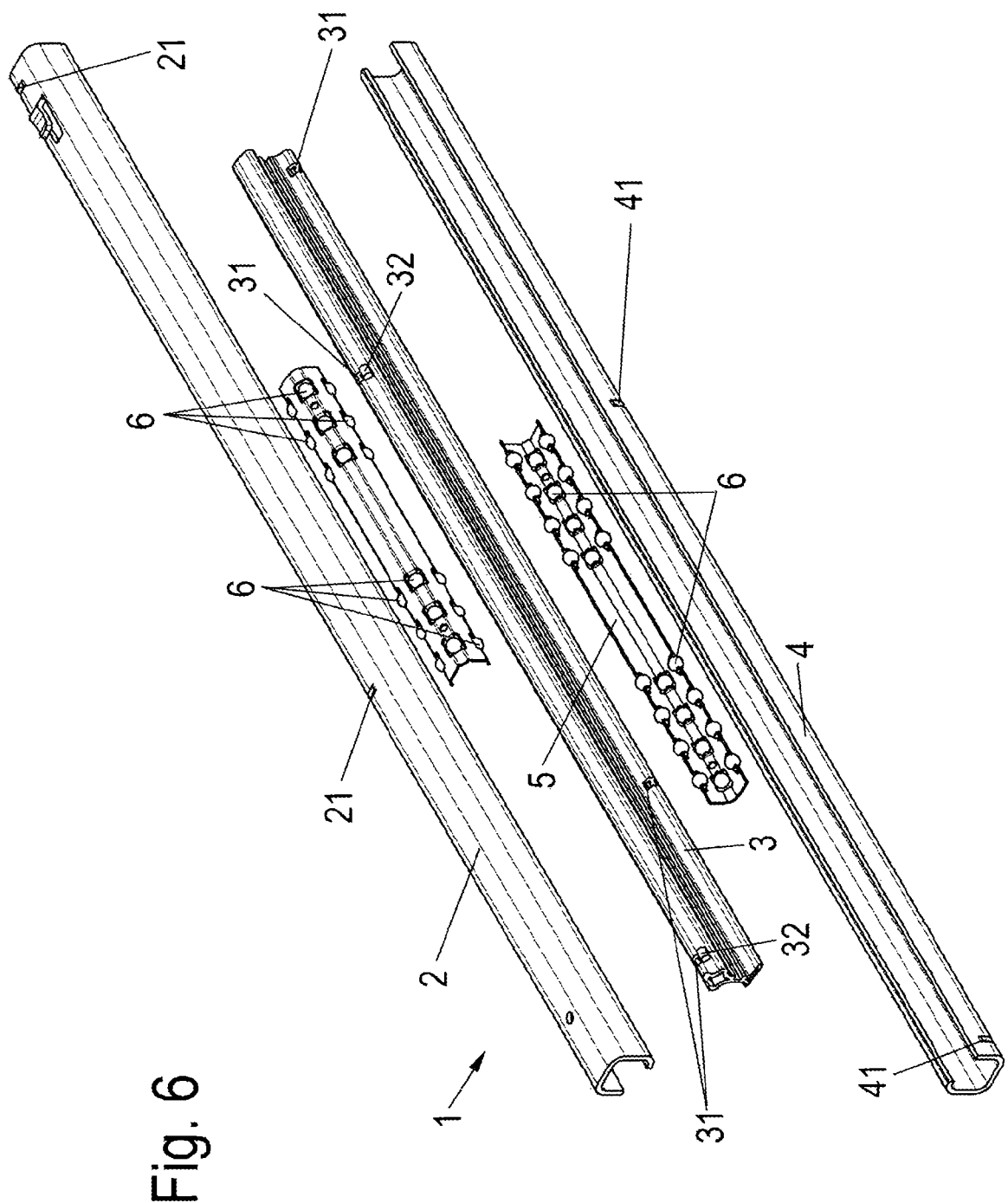
FIG. 6 shows a perspective exploded view of a further embodiment of a pull-out guide in accordance with the present disclosure.
Figure 7:
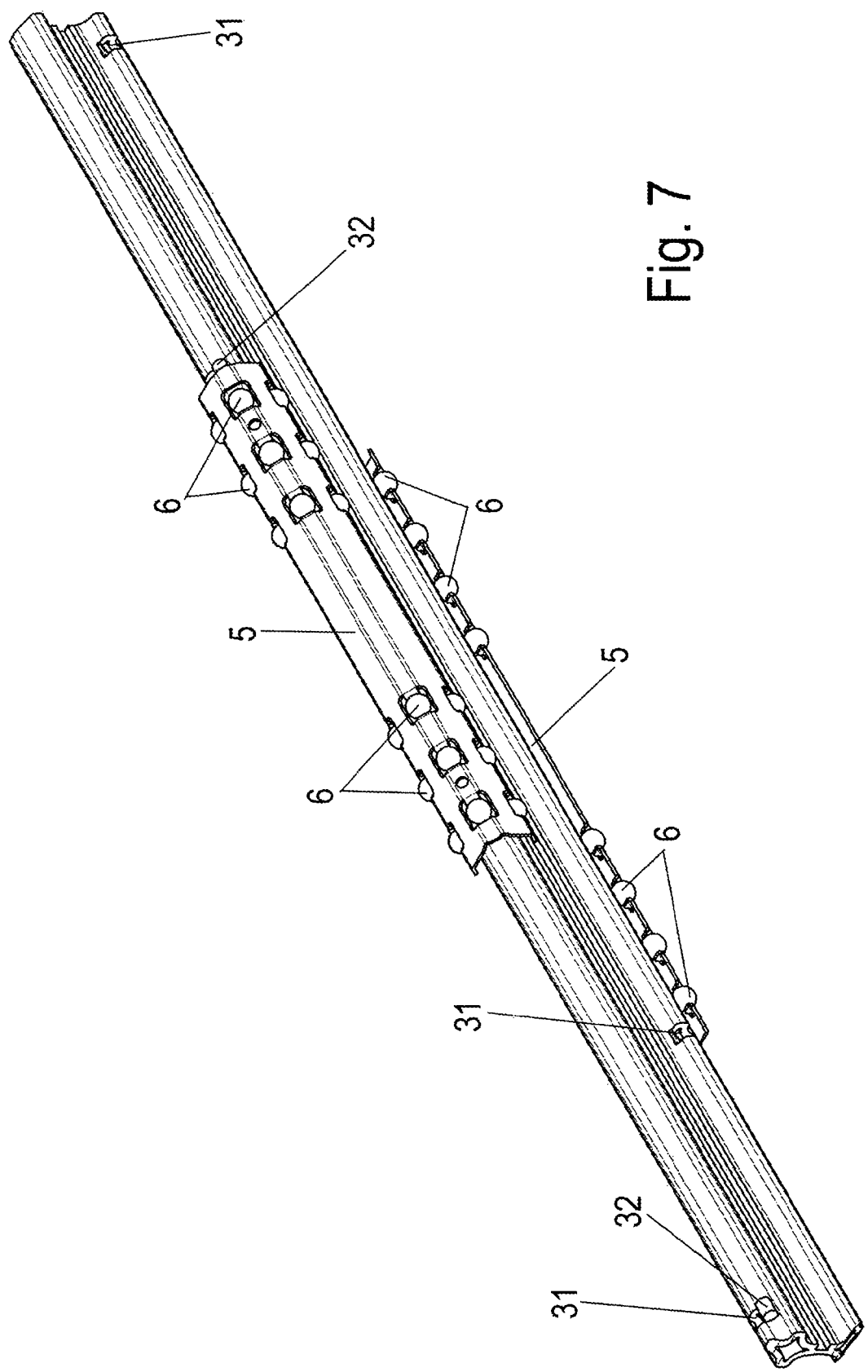
FIG. 7 shows a perspective view of the middle rail of the pull-out guide of FIG. 6 and showing the rolling bodies and the rolling-body cages arranged around the middle rail.

FIGS. 1 and 6 show embodiments of a pull-out guide, in accordance with the present disclosure, which pull-out guides are designated with reference numeral 1. The pull-out guide 1 comprises a guide rail 4 which can, for example, be fixed to a side wall of a domestic appliance such as a baking oven, a pyrolysis oven, a dishwasher, a piece of furniture or any other component such as, for example, a side grating in a cooking device. A middle rail 3 may be displaceably mounted on guide rail 4 via rolling bodies 6. A running rail 2 may be displaceably mounted in the same manner on the middle rail 3 via further rolling bodies 6. The rolling bodies 6 are held on the rolling-body cages 5 in a manner combined into packets.

Figure 3:
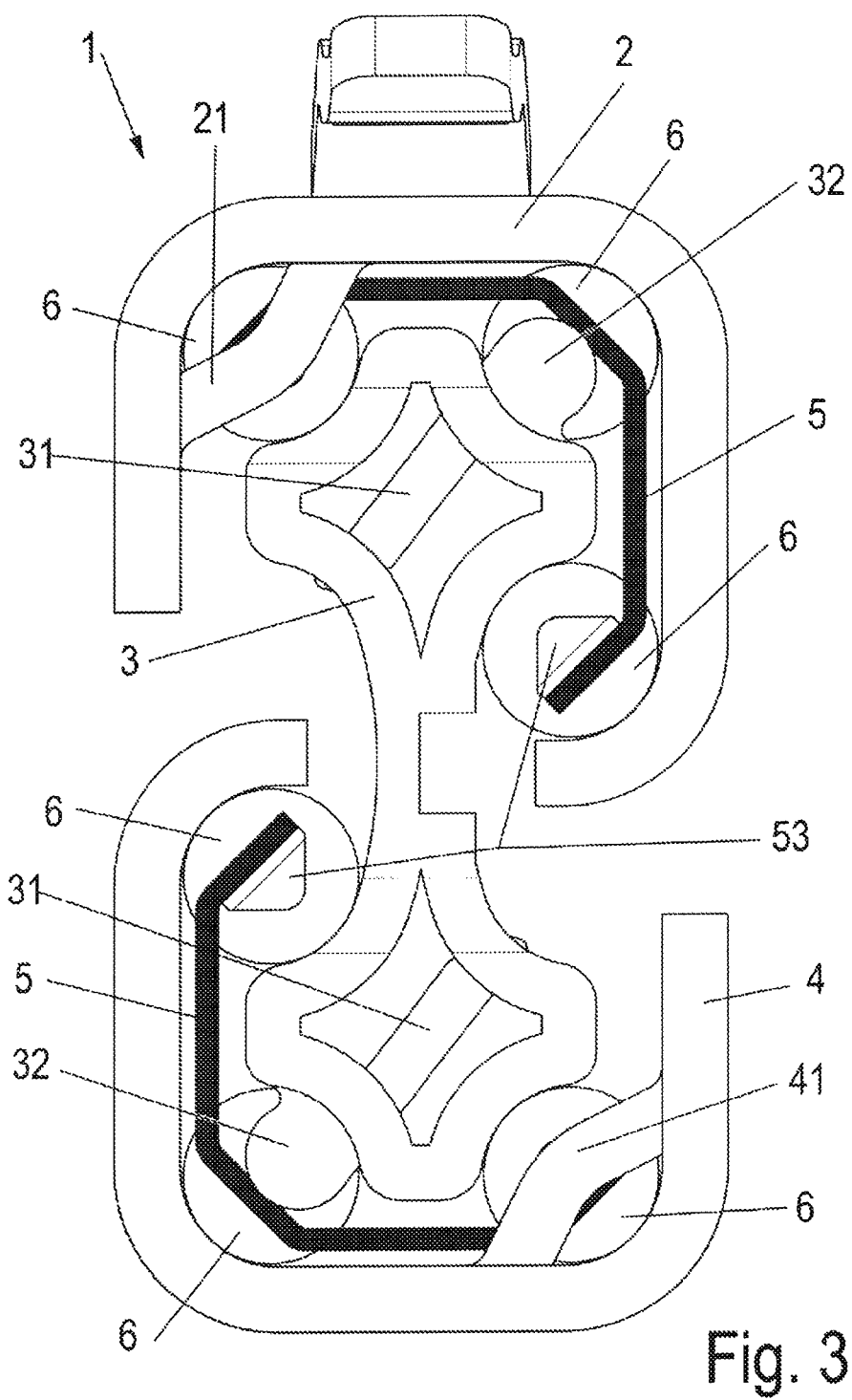
FIG. 3 shows a top view from the front of the pull-out guide of FIG. 1 and FIG. 2.

As is shown in FIGS. 1 and 6, crosspieces 21, 32, 41 are shaped into one of the respective rails, that is, on one or more of the guide rail 4, the middle rail 3 and the running rail 2. The crosspieces 21, 32, 41 are used as stops for fixing the running ranges or paths of displacement of one or more of the individual rails 2, 3, 4, relative to one another. The crosspieces 21, 41 are shaped inwardly from the outside into the guide rail 4 and into the running rail 2, and may be, for example, arranged as a bridge which extends into the path of displacement, or displacement path, of the rolling-body cage 5. In the embodiment, as shown in FIG. 3, the crosspieces 21, 41, which are arranged as a bridge, are respectively shaped into a corner region of the guide rail 4 and the running rail 2. This is so that rolling-body cage 5, which is displaceable along the inside of the guide rail 4 and the running rail 2 in the direction of displacement x, can only be moved in a reciprocating fashion within the region between the two crosspieces 21, 41.

The crosspiece 21, 41 of the guide rail 2 and the running rail 2, which is arranged as a bridge, extends diagonally between two adjacent side walls of the guide rail 4 and the running rail 2 and impinges, in function, on a face side of the rolling-body cage 5 displaceable within the guide rail 4 and the running rail 2.

The crosspieces 32 arranged on the middle rail 3 may be, for example, shaped in the manner of a cylinder. The cylindrical shape of the crosspiece 32 is provided in such a way that a face side of the cylinder is used as a stop surface for a rolling body 6, which is on the outside as seen in the direction of displacement x, and which is displaceably arranged on the outside on the middle rail 3 in a track of the middle rail 3. The crosspieces 32 extend up to at least half the radius of the rolling body 6 into the path of displacement of the rolling bodies 6 in order to prevent the rolling body 6 from being pressed out of the plane of the displacement direction x against one of the running surfaces of one of the rails 2, 3, 4. The maximum length of the crosspieces 32 is limited by the track of the oppositely disposed running rail 2 and middle rail 4, on which the crosspiece 32 must not impinge.

As is shown in FIG. 3, the embodiment of the pull-out guide 1. in accordance with the present disclosure comprises both at least one crosspiece 21, 41 which is arranged as a bridge shaped transversely to the direction of displacement x and interacts in function with the rolling-body cage 5, and also one further crosspiece 32 interacting with the rolling body 6 and protruding at least up to half of the radius of the rolling body 6.

In order to prevent a collision of the crosspieces 21, 32, 41 in this combination of the crosspieces 21, 32, 41, the crosspieces 21, 32, 41 are arranged on the guide rail 4, the middle rail 3 and the running rail 2 in such a way that they extend in, respectively, different running parts in which the rolling bodies 6 are arranged behind one another in the direction of displacement x.

In addition to the arrangement of the crosspieces 21, 41, which are shown in FIG. 3 and are arranged as bridges and correspond with the face sides of the rolling-body cages 5 in function, further or alternative possibilities for arrangement of the crosspieces 21, 41 are within the scope of the present disclosure, and may be as shown in FIGS. 12 to 14. In the embodiment as shown in FIG. 12, one respective further crosspiece 21, 41 is provided in the guide rail 4 and the running rail 2, which crosspiece 21, 41 does not extend diagonally between two adjacent side walls of the guide rail 4 or the running rail 2 as a bridge, but as a crosspiece which extends into the guide rail 4 or the running rail 2 and which protrudes inwardly from one of the side walls of the guide rail 4 or the running rail 2.

Figure 8:
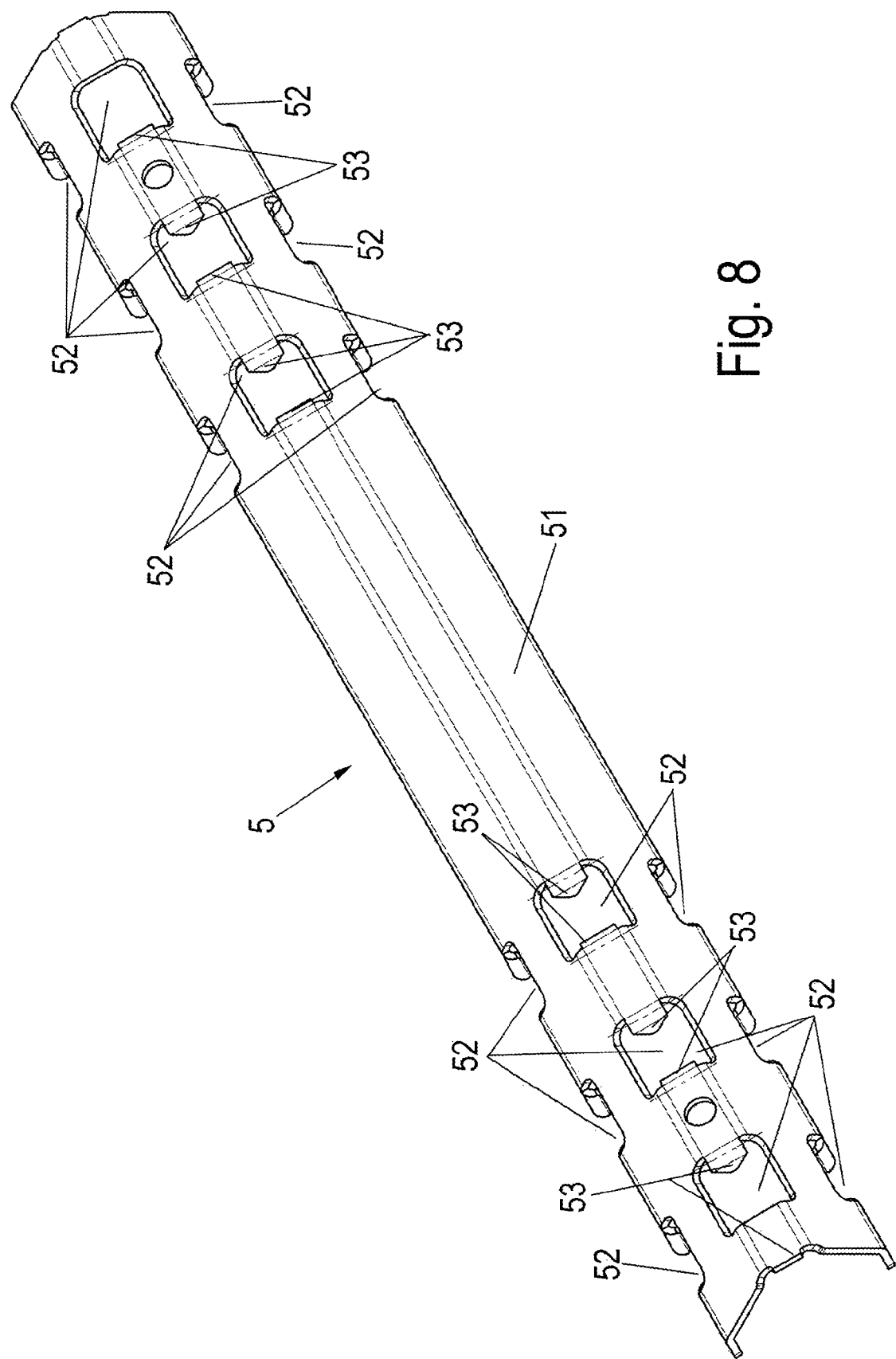
FIGS. 8 to 10 show different views of a rolling-body cage of the pull-out guide in accordance with the present disclosure.
Figure 9:
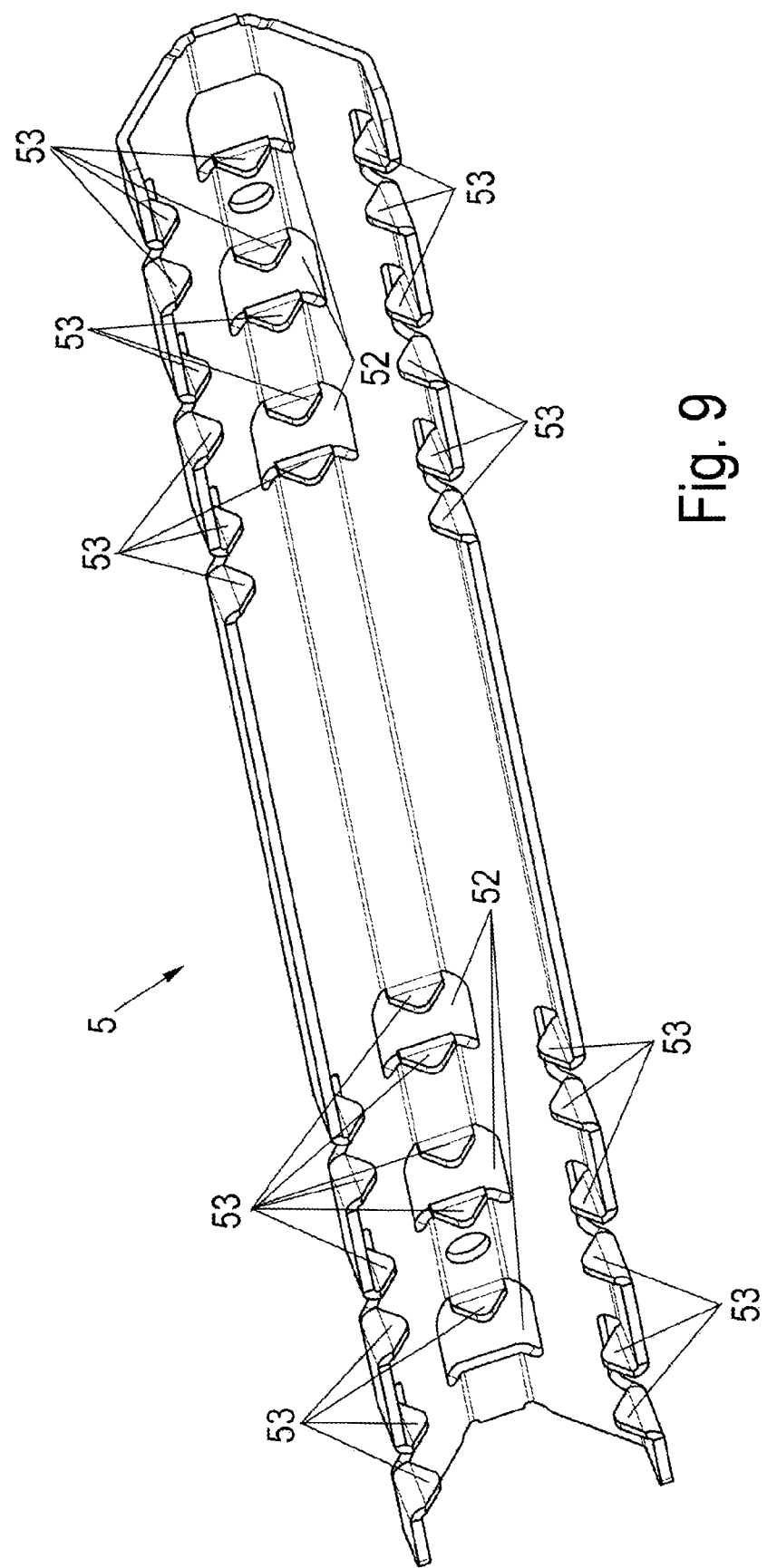
Figure 10:
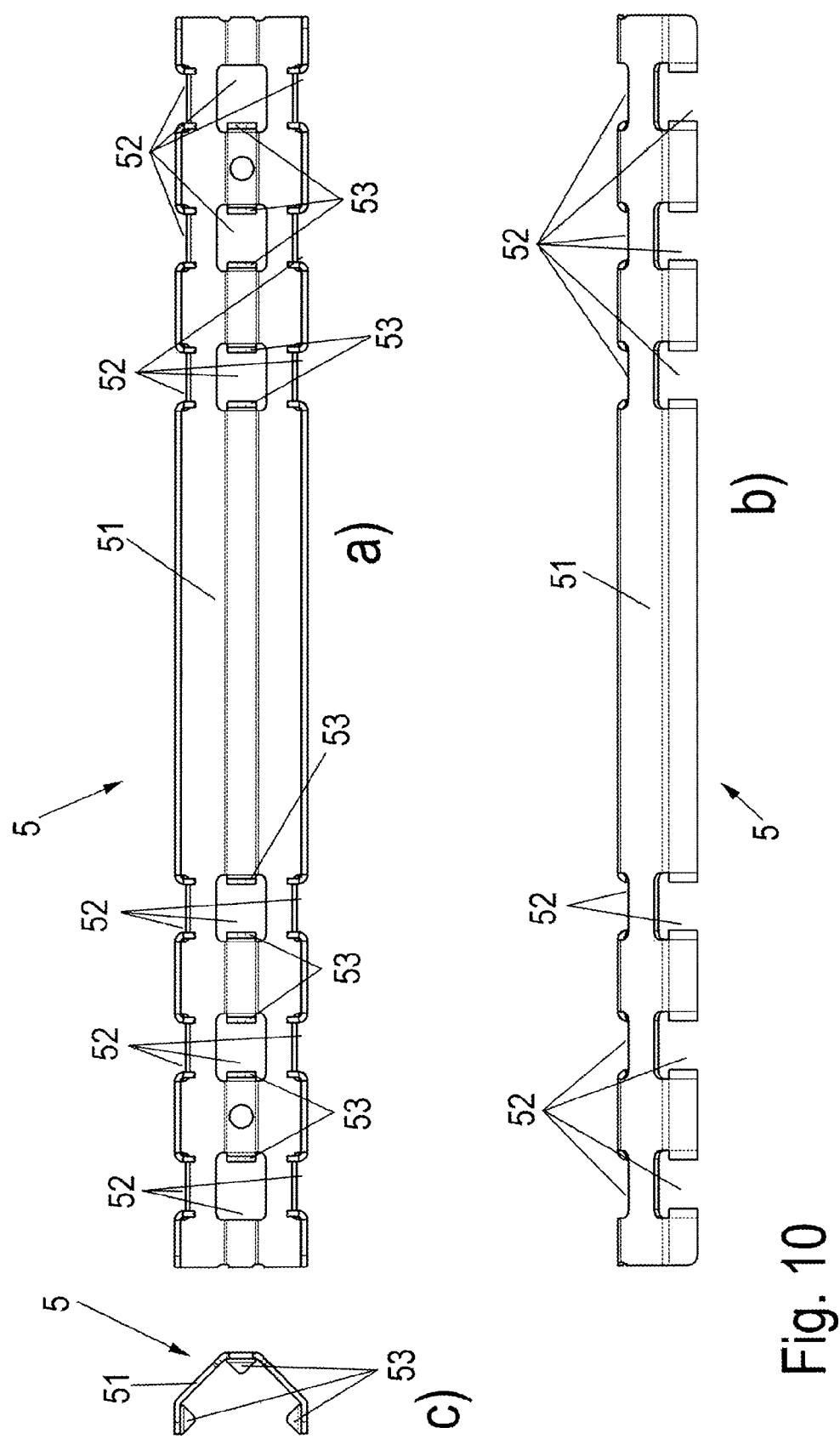
Figure 11:
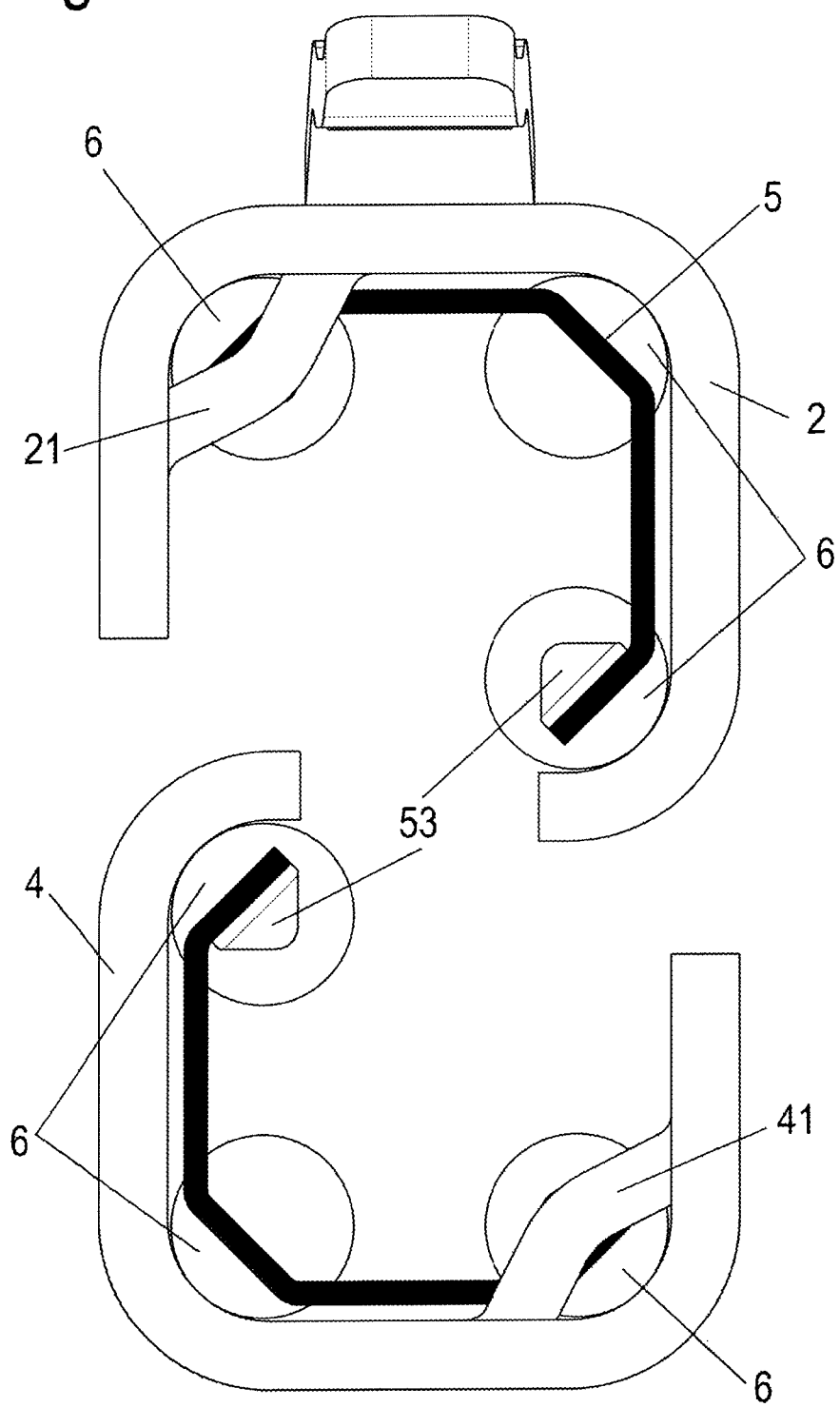

As is shown in FIGS. 8 to 10, the rolling-body cages 5 in which the rolling bodies 6 are held, are shaped in such a way that several rows of rolling bodies 6 arranged in parallel with respect to each other can be held in rolling-body receiving openings 52. Caps 53, which may, for example, be respectively shaped in a triangular fashion, extend for guiding the rolling bodies 6 on the rolling-body receiving openings 52 on the edges extending transversely to the direction of displacement x. In order to enable direct contact of the crosspieces 32 shaped out of the middle rail 3 with an outer rolling body 6, as seen in the direction of displacement x of the rolling-body cage 5, the rolling-body receiving openings 52 arranged at the end of one of the running rows of the rolling bodies 6 are provided with such a cap 53 only on the edge facing the middle as seen in the longitudinal direction of the rolling-body cage 5. Accordingly, the edge of the outermost rolling-body receiving opening 52, facing away from the middle of the rolling-body cage 5 is free from such a cap 53, so that the rolling body 6 guided therein can come into direct contact with a crosspiece 32 during approach to the crosspiece.

The rolling bodies 6 may, for example, be arranged as rolling-body balls. An arrangement of the rolling bodies in a cylindrical shape is also within the scope of the present disclosure.

Figure 4:
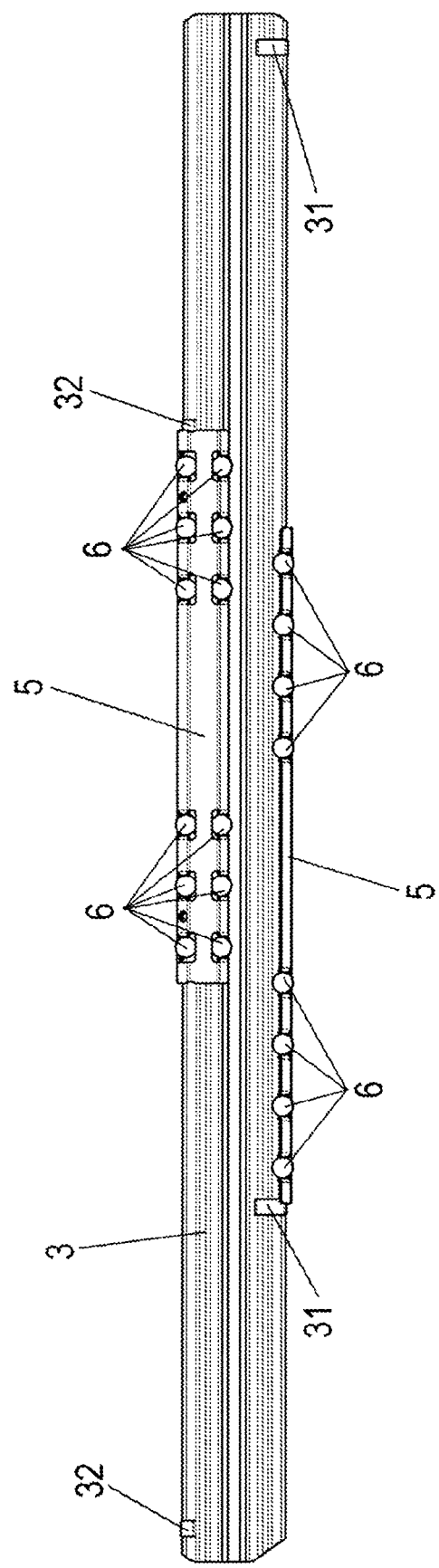
FIG. 4 shows a side view of the pull-out guide of the FIGS. 1 and 2 without showing the guide and running rail.

FIG. 4 shows a middle rail with rolling-body cages 5 arranged thereon with rolling bodies 6 guided therein. The rolling-body cages 5 are shown in a position directly before a stop situation with the crosspieces 32 disposed at the same height as the shaped portions 31.

Figure 5:
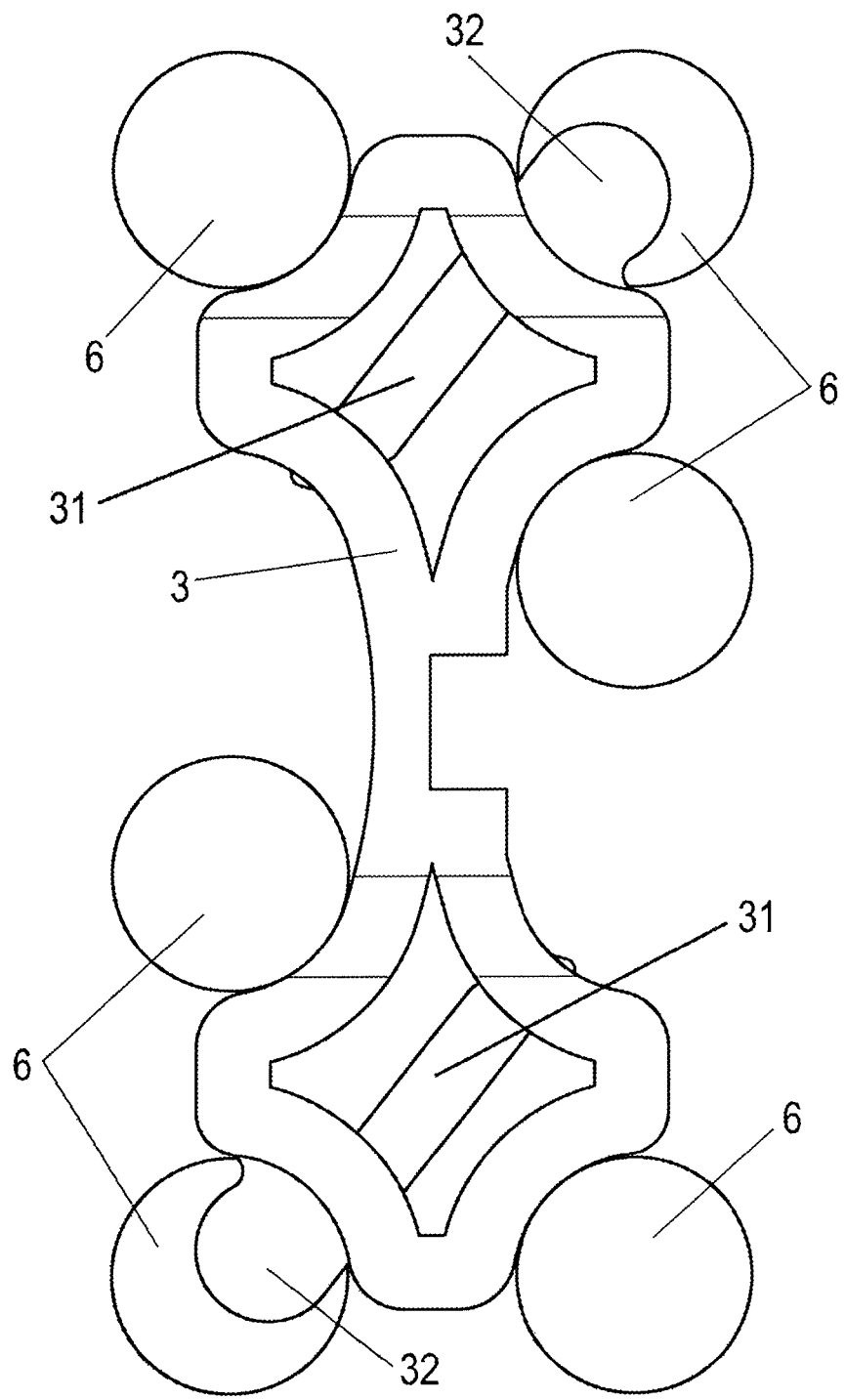
FIG. 5 shows a front view of the middle rail and the rolling bodies arranged around the middle rail of FIG. 4 without showing the rolling-body cage.

FIG. 5 shows the middle rail 3 of FIG. 4 in a front view and without illustration of the rolling-body cages 5. FIG. 5 shows the crosspieces 32, which are outwardly shaped from the middle rail 3, and which respectively protrude into a running path of the rolling bodies 6. The shaped portions 31 may be, for example, arranged integrally with the crosspieces 32.

Figure 15:
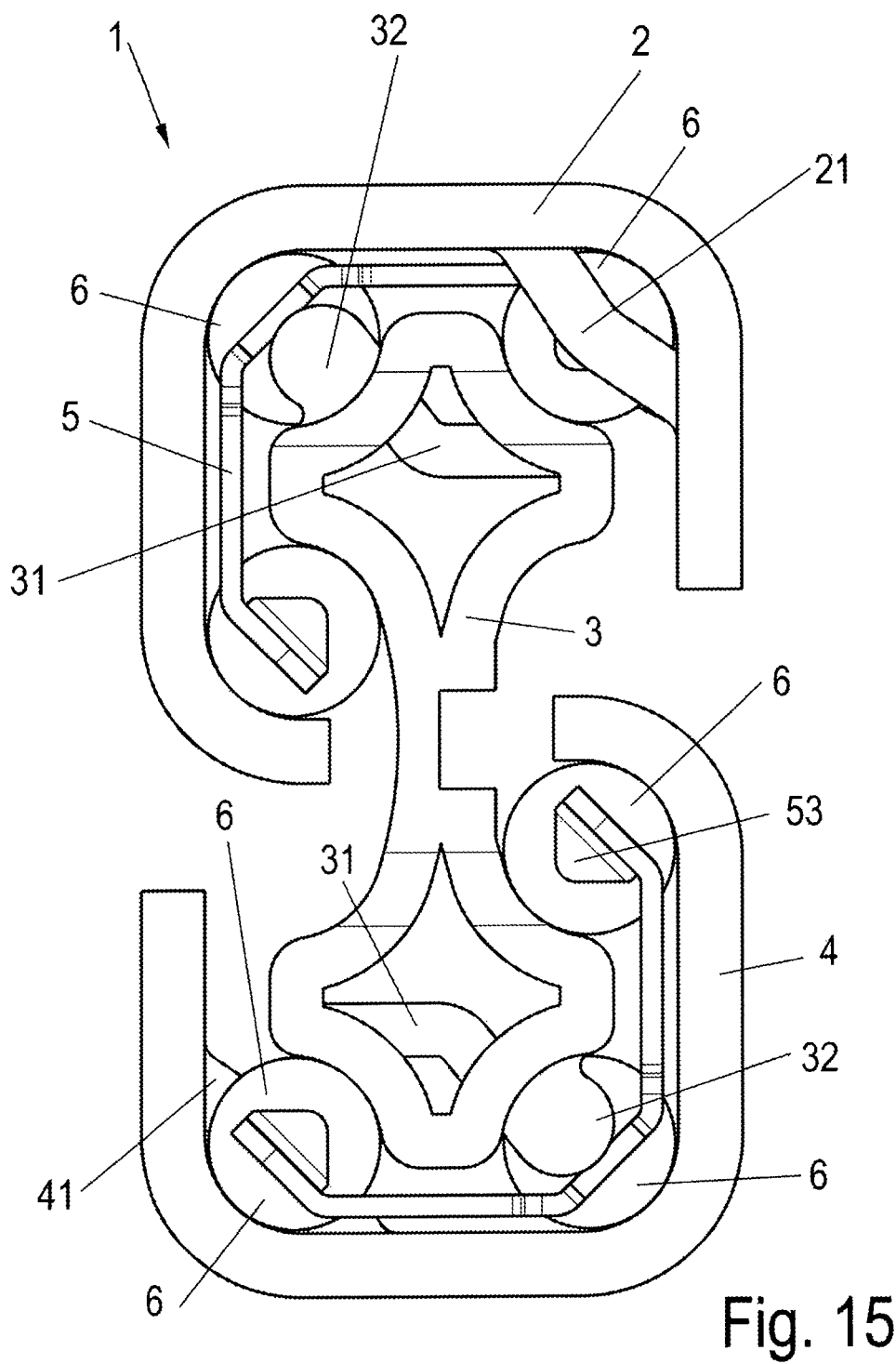
FIG. 15 shows a top view from the front of an alternative embodiment of the pull-out guide of FIG. 1 and FIG. 2, in accordance with the present disclosure.
Figure 16:
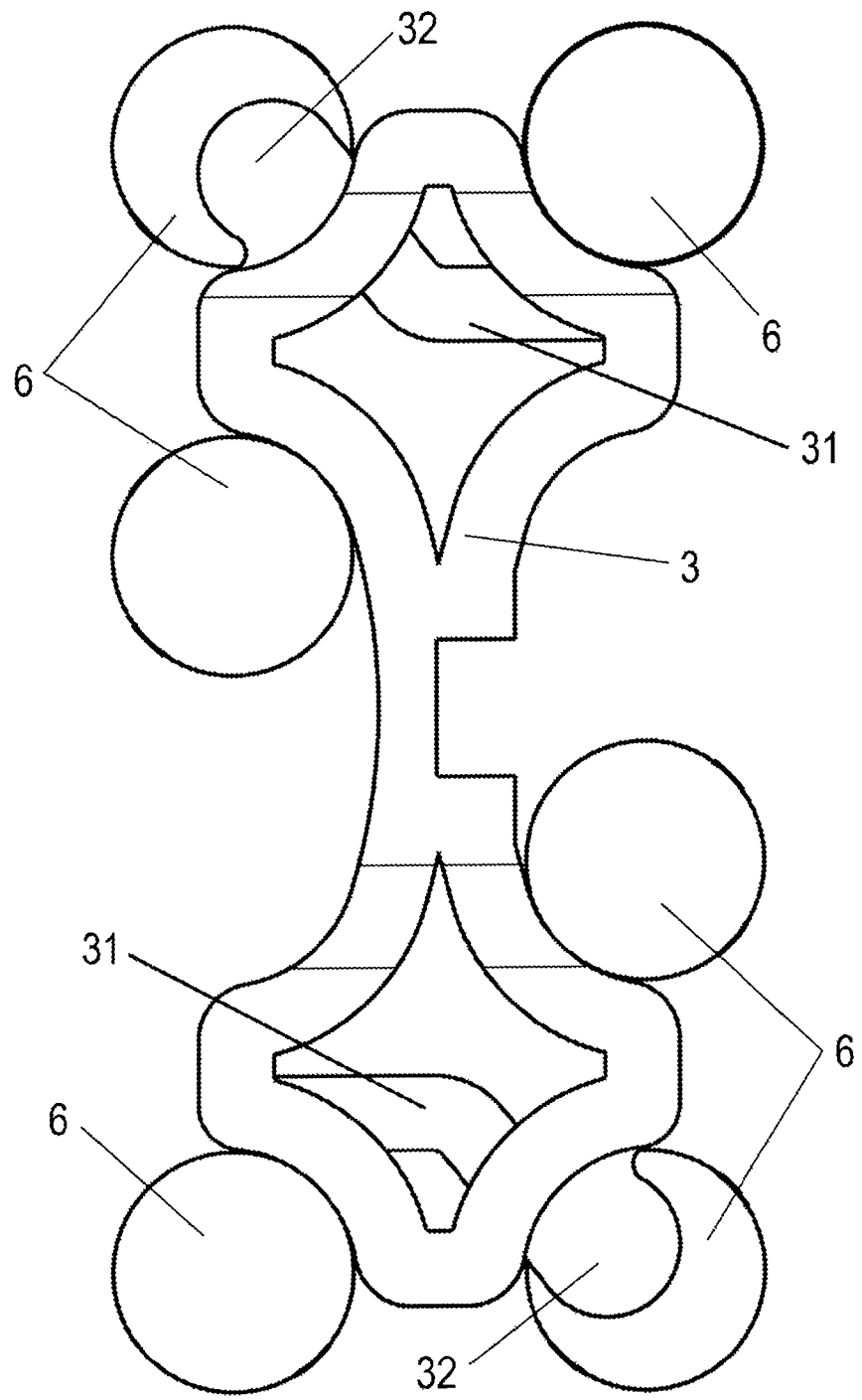
FIG. 16 shows a front view of the middle rail of the pull-out guide of FIG. 15 and the rolling bodies arranged around the middle rail without showing the rolling-body cage.

FIGS. 15 and 16 show a further embodiment of the shaping of the shaped portions 31, in accordance with the present disclosure. The shaped portions 31 do not extend, in this embodiment, diagonally relative to the cross section of the middle rail, but are bent off from the cross section. This shaping of the shaped portions 31 can be introduced in an especially careful manner into the running paths of the rolling body 6 by deformation, especially by pressing in the running path, all in accordance with the present disclosure.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A pull-out guide for domestic appliances, the pull-out guide comprising:
   a guide rail;
   at least one additional rail displaceably mounted relative to the guide rail via a rolling body in a rolling-body cage; and
   at least one stop configured to limit a displacement path of the at least one additional rail;
   the at least one stop configured as a first crosspiece and shaped onto one of the guide rail and the at least one additional rail;
   the at least one stop projecting into the displacement path of one of the rolling-body cage and the rolling body, the rolling body being an outer rolling body; and
   the at least one stop projecting up to at least half of the radius of the outer rolling body as seen in a direction of displacement;
   wherein the first crosspiece is arranged as a bridge shaped transversely to the direction of displacement and interacts with the rolling-body cage.

2. The pull-out guide according to claim 1, wherein the first crosspiece is arranged as a bridge shaped transversely to the direction of displacement and interacts with the rolling-body cage, and a second crosspiece interacts with the outer rolling body and projects at least up to half the radius of the rolling body.

3. The pull-out guide according to claim 1, wherein the first crosspiece is arranged as a bridge that extends diagonally between two adjacent side walls of one of the guide rail and the at least one additional rail, and the first cross piece impinges on a face side of the rolling-body cage.

4. The pull-out guide according to claim 1, wherein the first crosspiece projecting into the displacement path of the rolling body is shaped in a cylindrical way and includes a face side configured as a stop surface.

5. The pull-out guide according to claim 1, wherein the first crosspiece is arranged as a bridge is shaped out of the guide rail and the at least one additional rail is configured as a running rail, and a second crosspiece protrudes into the displacement path of the rolling body and the second crosspiece is shaped on the at least one additional rail that is configured as a middle rail.

6. The pull-out guide according to claim 1, wherein the rolling-body cage includes inwardly facing caps which are arranged behind one another on edges of rolling-body receiving openings in the direction of displacement, with the caps disposed at an outermost position in the direction of displacement being spared.

7. The pull-out guide according to claim 1, wherein the guide rail and the at least one additional rail include running surfaces extending parallel with respect to one another and configured to accommodate several rows of rolling bodies which are arranged in the rolling-body cage parallel with respect to each other in the displacement direction, and the first crosspiece protruding into the displacement path of the rolling-body cage is shaped out of a first of the running surfaces of the guide rail and the at least one additional rail, and the first crosspiece protruding into the path of displacement of the rolling bodies is shaped out of one of the guide rail parallel to the first of the running surfaces and the at least one additional rail.

8. A pull-out guide for domestic appliances, the pull-out guide comprising:
   a guide rail;
   at least one additional rail displaceably mounted relative to the guide rail via a rolling body in a rolling-body cage; and
   at least one stop configured to limit a displacement path of the at least one additional rail;
   the at least one stop configured as a first crosspiece and shaped onto one of the guide rail and the at least one additional rail;
   the at least one stop projecting into the displacement path of one of the rolling-body cage and the rolling body, the rolling body being an outer rolling body; and
   the at least one stop projecting up to substantially a rotational axis of the outer rolling body as seen in a direction of displacement;
   wherein the first crosspiece is arranged as a bridge shaped transversely to the direction of displacement and interacts with the rolling-body cage.

9. The pull-out guide according to claim 8, wherein a second crosspiece interacts with the outer rolling body.

* * * * *